June 1, 1965     A. J. SMITH ETAL     3,186,744
PIPE COUPLING DEVICE WITH DUAL CLAMPING MEANS
Filed Dec. 3, 1962
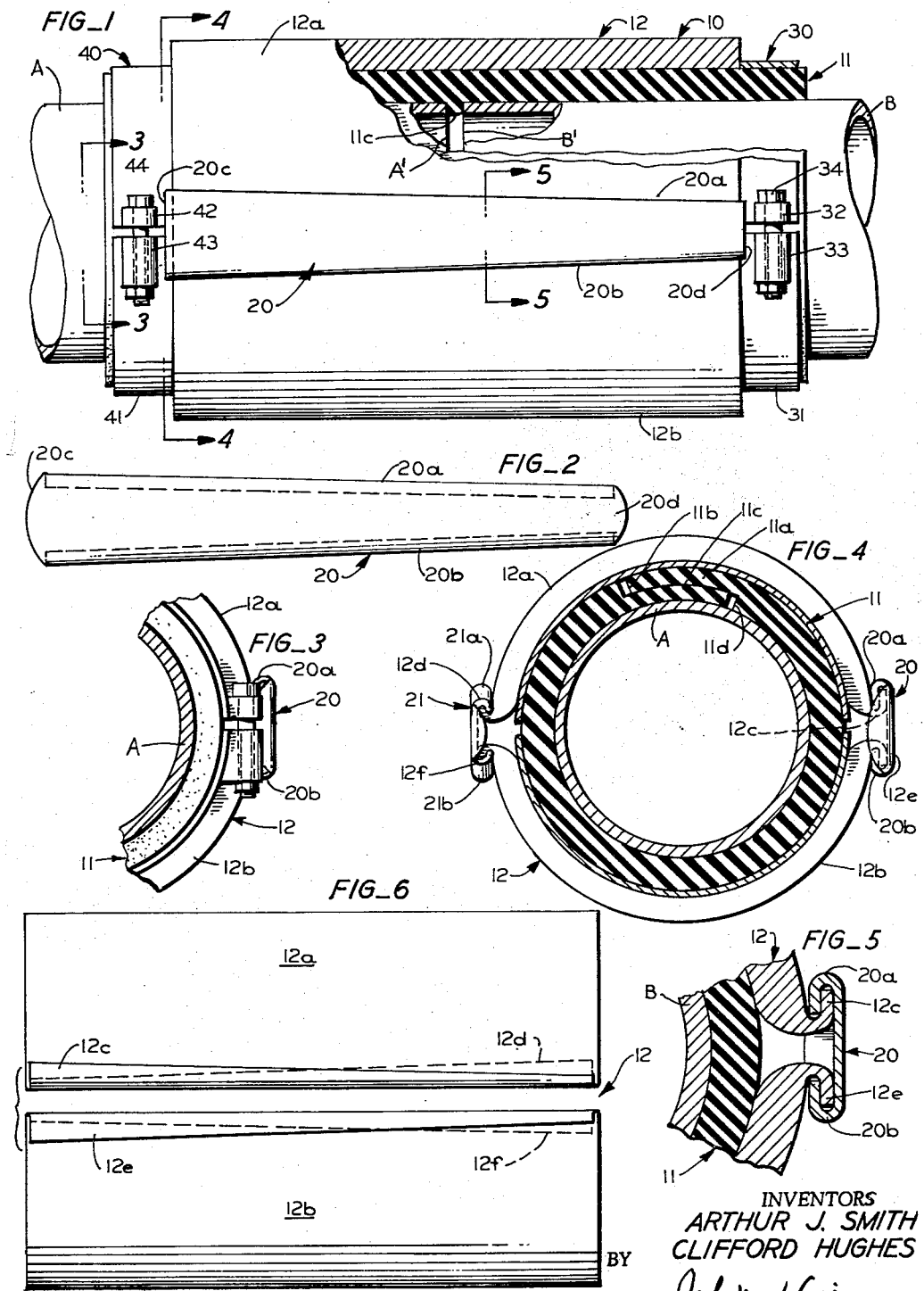
INVENTORS
*ARTHUR J. SMITH
CLIFFORD HUGHES*
BY *Jack M. Wiseman*
ATTORNEY 3,186,744
PIPE COUPLING DEVICE WITH DUAL
CLAMPING MEANS
Arthur J. Smith, 4037 Golf Road, San Jose, Calif., and Clifford R. Hughes, 2945 Miles Drive, Santa Clara, Calif.
Filed Dec. 3, 1962, Ser. No. 241,943
1 Claim. (Cl. 285—373)

The present invention relates in general to drainage systems and more particularly to a pipe coupling device adaptable for use in a drainage system.

Presently, one end of the conventional drainage pipe is formed with an increased diameter portion, which is referred to as a hub. Drainage pipes are generally joined or connected by placing adjacent pipes end to end with the hubs thereof spaced successively the length of the pipes. One end of a drainage pipe is inserted into the hub of the confronting end of the adjacent pipe. Thereupon, the space between the inner cylindrical wall of the hub and the outer cylindrical wall of the inserted pipe is filled with lead and oakum or other composition to seal the joint or connection against water and gas leaks.

An object of the present invention is to provide a pipe coupling device for joining adjacent ends of pipes and sealing the joined ends against gas and water leaks without employing lead and oakum or a similar composition.

Another object of the present invention is to provide a pipe coupling device for joining adjacent ends of drainage pipes without requiring a hub to be formed on either of the joined pipes.

Another object of the present invention is to provide an economical device for joining adjacent ends of sewer or drainage pipes.

Another object of the present invention is to provide a device for joining confronting ends of pipes with facility and ease of operation.

Another object of the present invention is to provide a device that joins confronting ends of pipes and that can be removed from the confronting ends of the pipes with facility and ease of operation.

Another object of the present invention is to provide a pipe coupling device which permits a section of a drainage pipe to be removed and replaced without removing the entire drainage pipe.

Another object of the present invention is to provide a coupling device for joining and separating adjacent ends of drainage pipes independently of or without shifting the other drainage pipes in a drainage system.

Another object of the present invention is to provide an improved pipe coupling device.

Another object of the present invention is to provide a pipe coupling device for drainage systems that enables exposed pipes and clean-out pipes to be replaced without installing a separate clean out section.

Other and further objects and advantages of the present invention will be apparent to one skilled in the art from the following description taken in conjunction with the accompanying drawings, in which:

FIG. 1 is a side elevational view of the pipe coupling device of the present invention, partially in section, and shown connecting confronting ends of axially aligned pipes.

FIG. 2 is a side elevational view of a locking device employed in the pipe coupling device of the present invention.

FIG. 3 is an enlarged, fragmentary, vertical section taken along line 3—3 of FIG. 1.

FIG. 4 is a vertical section taken along line 4—4 of FIG. 1.

FIG. 5 is an enlarged, fragmentary, vertical section taken along line 5—5 of FIG. 1.

FIG. 6 is a front elevational view of the housing for the locking device of the present invention illustrated with the locking device removed therefrom.

Illustrated in FIG. 1 is a pipe A and a pipe B of a drainage system which are disposed in axial alignment and have their confronting ends A' and B', respectively, joined or connected by the pipe coupling device 10 of the present invention.

The pipe coupling device 10 comprises a resilient or flexible sleeve or gasket 11 (FIGS. 1 and 4), which is made of suitable material, such as rubber. As shown in FIG. 4, the rubber sleeve 11 is formed with a separable, but overlapping, axially extending portion 11a. For this purpose, an axially disposed slit 11b extends from the outer cylindrical wall of the sleeve 11 to a midway point between the inner and outer walls thereof. An axially disposed slit 11c is formed at the inner end of the slit 11b and extends concentrically with the sleeve 11 midway between the inner and outer walls thereof. The slit 11c terminates at an axially disposed slit 11d, which projects therefrom to the inner cylindrical wall of the sleeve 11. Through this arrangement, the sleeve 11 can be separated in an axial direction to receive the confronting ends A' and B' of the pipes A and B. When the sleeve 11 is released, it is wrapped around the confronting ends A' and B' of the pipes A and B through its own resilient action in tight fitting relation therewith to form a sealing engagement at its overlapping portion 11a.

From FIG. 1 it is to be observed that the confronting ends A' and B' of the pipes A and B are spaced apart although joined. Formed along the inner wall of the rubber sleeve 11 midway between the opposing ends thereof is an annular projection or a ring 11c, which serves as a stop for confronting ends A' and B' of the pipes A and B to maintain a fixed spaced relation therebetween and also to guide or limit the movement of the pipes A and B toward one another.

Encircling and enveloping the rubber gasket 11 is a cylindrical housing or jacket 12, which is made of a suitable malleable metal, such as a malleable iron. The housing 12 protects the sleeve 11 against rupture and damage. As shown in FIGS. 4 and 6, the malleable housing 12 comprises two semi-cylindrical sections 12a and 12b. The axially extending edges of the semi-cylindrical section 12a are turned upwardly to form tapered flanges or rails 12c and 12d (FIGS. 4 and 6). The flange 12c gradually increases in elevation from left to right as viewed in FIG. 6. The flange 12d, however, gradually increases in elevation in an opposite direction. Hence the highest portion of the flange 12d is diametrically opposite the lowest portion of the flange 12c and conversely the lowest portion of the flange 12d is diametrically opposite the highest portion of the flange 12c.

In a like manner, the axially extending edges of the semi-cylindrical section 12b are turned downwardly to form tapered flanges or rails 12e and 12f (FIGS. 4 and 6). The flange 12e gradually increases in elevation from left to right as viewed in FIG. 6. The flange 12f, however, gradually increases in elevation in an opposite direction from that of the flange 12e in a manner similar to that previously described for flanges 12c and 12d. It is apparent from FIG. 4 that the flange 12c of the section 12a is facing the flange 12e of the section 12b and the flange 12d of the section 12a is facing the flange 12f of the section 12b.

According to the present invention, diametrically opposite, axially extending locking devices 20 and 21 are employed to grip in locking engagement the semi-cylindrical sections 12a and 12b of the cylindrical housing 12. For this purpose, the locking device 20 comprises a downwardly directed, tapered lip or flange 20a formed along a longitudinally extending edge thereof and an upwardly directed, tapered lip or flange 20b formed along an opposite longitudinally extending edge thereof. The locking device 20 increases in height from left to right as viewed in FIGS. 1 and 2.

The locking device 21, which is similar to the locking device 20, also includes a downwardly directed, tapered lip or flange 21a formed along a longitudinally extending edge thereof and an upwardly directed, tapered lip or flange 21b formed along an opposite longitudinally extending edge thereof. The locking device 21 increases in height in an axial direction opposite to the axial direction that the locking device 20 increases in height. From FIG. 4 it is to be observed that the locking device 21 engages the rails 12c and 12e, and the locking device 21 engages the rails 12d and 12f.

For locking the semi-cylindrical sections 12a and 12b of the cylindrical housing 12 to compress the rubber sleeve 11 in water and gas tight relationship with the joined confronting ends A' and B' of the pipes A and B, the locking device 20 has its extreme left hand position (as viewed in FIGS. 1 and 2) placed at the extreme right hand portion of the rails 12c and 12e (as viewed in FIGS. 1 and 6). The lips 20a and 20b of the locking device 20 is disposed to grip the rails 12c and 12e of the housing 12 (FIGS. 4 and 5). Thereupon, the locking device 20 is driven left to right, as viewed in FIG. 1, in a direction parallel to the axis of the housing 12 causing a gradually increasing gripping action. As a consequence thereof, the rubber sleeve 11 is compressed as the locking device 20 reaches the position shown in FIG. 1 to form a seal to minimize water and gas leaks from the confronting ends A' and B' of the joined pipes A and B.

In addition to the foregoing, the locking device 21 has its end of greatest height placed adjacent the end of the rails 12d and 12f having their minimum height. The lips 21a and 21b of the locking device 21 is disposed to grip the rails 12d and 12f of the housing 12 (FIG. 4). Thereupon, the locking device 21 is driven to the opposite end in a direction parallel to the axis of the housing 12 until it has assumed a position similar to that shown for the locking device 20 in FIG. 1. This results in a gradually increasing gripping action on the part of the locking device 21. Consequently, the rubber sleeve 11 is compressed to form a seal to minimize water and gas leaks from the confronting ends A' aand B' of the joined pipes A and B.

To minimize the loosening of the locking devices 20 and 21 by vibrations, expansions, contractions, settlements and the like, at each of the locking devices 20 and 21 are located tabs, such as tabs 20c and 20d for the locking device 20. After the locking devices 20 and 21 are in their locking positions, the tabs thereof are bent inwardly to grip the end faces of the housing 12.

For further reducing any gas and water leaks from the connected pipes A and B at the confronting ends A' and B' thereof, a clamp 30 in the form of a steel band 31 (FIG. 1) is placed around the rubber sleeve 11 in abutting engagement with an end face of the housing 12. In a like manner a clamp 40 in the form of a steel band 41 (FIG. 1) is placed around the rubber sleeve 11 in abutting engagement with an opposite end face of the housing 12. The band 31 includes internally threaded spaced ears 32 and 33 that receive in threaded engagement bolt 34. Through this arrangement the band 31 is tightened and secured for compressing the rubber sleeve 11. The band 41 also includes internally threaded, spaced ears 42 and 43 that receive in threaded engagement a bolt 44. In this manner, the band 41 is tightened and secured for compressing the rubber sleeve 11.

In employing the pipe coupling device 10, axially aligned pipes A and B are placed end-to-end with the confronting ends A' and B' spaced apart. The rubber sleeve 11 is extended to be placed around the confronting ends A' and B' with the ring 11e thereof therebetween. With the confronting ends A' and B' engaging the ring 11e, the sleeve 11 is released and through the resilient action thereof wraps around the confronting ends A' and B' of the pipes A and B.

The semi-cylindrical sections 12a and 12b of the housing 12 are now placed around the rubber sleeve 11 with the rail 12c adjacent the rail 12e and with the rail 12d adjacent the rail 12f. Thereupon, the locking device 20 has its extreme left hand portion (as viewed in FIGS. 1 and 2) placed at the extreme right hand portion of the rails 12c and 12e (as viewed in FIGS. 1 and 6). The lips 20a and 20b of the locking device 20 is disposed to grip the rails 12c and 12e of the housing 12 (FIGS. 4 and 5). Now, the locking device 20 is driven left to right, as viewed in FIG. 6, in a direction parallel to the axis of the housing 12 causing a gradually increasing gripping action to compress the rubber sleeve 11 to form a seal against water and gas leaks from the confronting ends A' and B' of the joined pipes A and B.

At this time, the locking device 21 has its highest end placed against the lowest end of the rails 12d and 12f. The lips 21a and 21b of the locking device 21 is disposed to grip the rails 12d and 12f of the housing 12 (FIG. 4). Thereupon, the locking device 21 is driven to the opposite end in a direction parallel to the axis of the housing 12 until it has assumed a position similar to that shown for the locking device 20 in FIG. 1. A gradually increasing gripping action on the part of the locking device 21 compresses the rubber sleeve 11 to form a seal for water and gas tight relationship with the confronting ends A' and B' of the joined pipes A and B.

Subsequently, the tabs of the locking devices 20 and 21, such as the tabs 20c and 20d of the locking device 20, are bent inwardly to grip the end faces of the housing 20. The clamp 30 is placed around the rubber sleeve 11 in abutting engagement with an end face of the housing 12. The bolt 34 is tightened to compress the rubber sleeve 11 and to secure the band 31. In a like manner, the clamp 40 is placed around the rubber sleeve 11 in abutting engagement with an opposite end face of the housing 12. The bolt 44 is tightened to compress the rubber sleeve 11 and to secure the band 41.

It is to be understood that modifications and variations of the invention disclosed herein may be resorted to without departing from the spirit of the invention and the scope of the appended claims.

Having thus described our invention, what we claim as new and desire to protect by Letters Patent is:

A pipe coupling device for connecting confronting spaced ends of adjacent pipes comprising a resilient sleeve split in an axial direction and arranged to be disposed around said adjacent pipes at the confronting ends thereof, said sleeve being formed with a concentric annular projection along the inner wall thereof for positioning intermediate the confronting ends of said adjacent pipes, said sleeve being formed to overlap along the split thereof, a malleable housing disposed around said sleeve and having a plurality of separated sections, said housing being formed along the edges of said sections with tapered flanges, said tapered flanges being arranged in pairs at confronting edges of said separated sections with respective pairs of said flanges being tapered in opposite directions, a locking device for each of said pairs of tapered flanges on said housing, each of said locking devices being formed with tapered, longitudinally extending, opposing flanges for gripping an associated pair of flanges on said housing, whereby imparting movement to said locking devices in opposite axial directions causes said housing to compress said sleeve to form an improved seal for said pipe coupling device, each of said locking devices being formed with bent end portions for engagement with opposite ends of said housing, and a band clamp disposed at each end of said sleeve, said clamps being disposed around said sleeve adjacent to opposite ends of said housing to further compress said sleeve for forming an improved seal for said pipe coupling device.

(References on following page)

References Cited by the Examiner

UNITED STATES PATENTS

| | | | |
|---|---|---|---|
| 48,517 | 7/65 | Chambers | 285—373 |
| 809,327 | 1/06 | Rieske | 285—421 X |
| 1,287,835 | 12/18 | Beedham | 285—419 |
| 1,926,197 | 9/33 | Durr | 285—383 X |
| 2,403,839 | 7/46 | Adolph | 285—419 X |
| 2,417,741 | 3/47 | Dillon | 285—373 |

FOREIGN PATENTS

| | | |
|---|---|---|
| 1,091,978 | 11/54 | France. |
| 177,939 | 4/22 | Great Britain. |
| 328,402 | 5/30 | Great Britain. |

CARL W. TOMLIN, *Primary Examiner.*